US012507302B2

(12) United States Patent
Asakura et al.

(10) Patent No.: US 12,507,302 B2
(45) Date of Patent: *Dec. 23, 2025

(54) COMMUNICATION DEVICE AND NON-TRANSITORY COMPUTER-READABLE RECORDING MEDIUM STORING COMPUTER-READABLE INSTRUCTIONS FOR TERMINAL DEVICE

(71) Applicant: BROTHER KOGYO KABUSHIKI KAISHA, Nagoya (JP)

(72) Inventors: Hirotaka Asakura, Nagoya (JP); Munehisa Matsuda, Nagoya (JP); Takuya Inoue, Nisshin (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,144

(22) Filed: Oct. 25, 2023

(65) Prior Publication Data

US 2024/0057188 A1 Feb. 15, 2024

Related U.S. Application Data

(63) Continuation of application No. 17/350,679, filed on Jun. 17, 2021, now Pat. No. 11,838,968.

(30) Foreign Application Priority Data

Jun. 23, 2020 (JP) .................................. 2020-108050

(51) Int. Cl.
 *H04W 76/15* (2018.01)
 *H04B 17/318* (2015.01)
 (Continued)

(52) U.S. Cl.
 CPC .......... *H04W 76/15* (2018.02); *H04W 76/18* (2018.02); *H04N 1/00233* (2013.01)

(58) Field of Classification Search
 CPC ......... H04M 2250/02; H04M 2250/06; H04M 1/6091; H04M 1/72412; H04W 88/06;
 (Continued)

(56) References Cited

U.S. PATENT DOCUMENTS 11,178,014 B1* 11/2021 Sevce ................. H04L 41/0893
2009/0248913 A1* 10/2009 Salokannel ........... G06Q 30/02
 710/33
(Continued)

FOREIGN PATENT DOCUMENTS

CN 108347539 B 7/2021
JP 2017175443 A 9/2017
(Continued)

OTHER PUBLICATIONS

Notice of Reasons for Refusal dated Jan. 9, 2024 received in Japanese Patent Application No. JP 2020-108050.

(Continued)

*Primary Examiner* — Marcus Smith
*Assistant Examiner* — Jason A Harley
(74) *Attorney, Agent, or Firm* — Scully, Scott, Murphy & Presser, P.C.

(57) ABSTRACT

A communication device may cause a first wireless interface of the communication device to send a first signal in a case where a state of the communication device is a respondent state. The respondent state may be a state in which a Wi-Fi connection is able to be established between the communication device and a terminal device. The first signal may be sent from the first wireless interface before a Bluetooth connection is established between the communication device and a terminal device. The communication device (Continued)

may cause the first wireless interface to send a second signal in a case where a state of the communication device is a non-respondent state. The non-respondent state may be a state in which the Wi-Fi connection is not able to be established. The second signal may be sent from the first wireless interface before the Bluetooth connection is established.

16 Claims, 7 Drawing Sheets

(51) Int. Cl.
*H04L 49/201* (2022.01)
*H04L 65/611* (2022.01)
*H04W 4/029* (2018.01)
*H04W 48/10* (2009.01)
*H04W 48/16* (2009.01)
*H04W 76/18* (2018.01)
*H04N 1/00* (2006.01)

(58) Field of Classification Search
CPC ....... H04W 4/80; H04W 8/005; H04W 48/10; H04W 76/10; H04L 45/308; H04L 67/51
USPC .......................................... 370/328; 455/41.2
See application file for complete search history.

(56) References Cited

U.S. PATENT DOCUMENTS

| | | | | |
|---|---|---|---|---|
| 2013/0178160 A1* | 7/2013 | Wang | ................... | H04W 48/10 455/41.2 |
| 2013/0178163 A1 | 7/2013 | Wang | | |
| 2014/0269348 A1* | 9/2014 | Mandiganal | .......... | H04W 84/18 370/246 |
| 2015/0173018 A1* | 6/2015 | Tomida | ................... | H04W 4/80 455/41.3 |
| 2016/0126749 A1 | 5/2016 | Shichino | | |
| 2016/0128119 A1* | 5/2016 | Maheshwari | ......... | H04W 76/14 370/329 |
| 2016/0353233 A1* | 12/2016 | Yong | ....................... | H04L 67/51 |
| 2017/0223579 A1 | 8/2017 | Lee et al. | | |
| 2017/0280502 A1 | 9/2017 | Mihira | | |
| 2017/0289393 A1* | 10/2017 | Yokoyama | ............ | H04W 76/10 |
| 2018/0184366 A1* | 6/2018 | Asakura | ................ | H04W 76/10 |
| 2018/0184484 A1 | 6/2018 | Mihira | | |
| 2019/0014608 A1 | 1/2019 | Asakura et al. | | |
| 2019/0020783 A1 | 1/2019 | Yokoyama et al. | | |
| 2019/0102123 A1 | 4/2019 | Inoue et al. | | |
| 2019/0334782 A1 | 10/2019 | Dellinger et al. | | |
| 2020/0174517 A1* | 6/2020 | Martinez | .......... | G06Q 10/06398 |
| 2020/0186669 A1 | 6/2020 | Yokoyama et al. | | |
| 2021/0112177 A1 | 4/2021 | Yokoyama et al. | | |
| 2022/0159143 A1 | 5/2022 | Yokoyama et al. | | |
| 2023/0254430 A1 | 8/2023 | Yokoyama et al. | | |

FOREIGN PATENT DOCUMENTS

| | | |
|---|---|---|
| JP | 2017184169 A | 10/2017 |
| JP | 2018006814 A | 1/2018 |
| JP | 2018042291 A | 3/2018 |
| JP | 2019016885 A | 1/2019 |
| JP | 2019068179 A | 4/2019 |

OTHER PUBLICATIONS

Wi-Fi Peer-to-Peer (P2P), Technical Specification Version 1.1, created by the Wi-Fi Alliance.
Extended European Search Report dated Nov. 19, 2021 from related EP 21179998.6.
Office Action dated Oct. 18, 2022 received in United States Patent Application No. U.S. Appl. No. 17/350,679.
Office Action dated Mar. 29, 2023 received in U.S. Appl. No. 17/350,679.
Notice of Allowance dated Jul. 25, 2023 received in U.S. Appl. No. 17/350,679.
Wi-Fi Peer-to-Peer (P2P), Technical Specification Version 1.5, created by the Wi-Fi Alliance, Aug. 4, 2014.
Office Action dated Aug. 8, 2023 received in European Patent Application No. EP 21179998.6.

* cited by examiner

COMMUNICATION DEVICE AND NON-TRANSITORY COMPUTER-READABLE RECORDING MEDIUM STORING COMPUTER-READABLE INSTRUCTIONS FOR TERMINAL DEVICE

CROSS-REFERENCE TO RELATED APPLICATION

This application is a continuation application of U.S. application Ser. No. 17/350,679 filed on Jun. 17, 2021, which claims priority to Japanese Patent Application No. 2020-108050, filed on Jun. 23, 2020, the entire contents of which are hereby incorporated by reference into the present application.

TECHNICAL FIELD

The present disclosure discloses a technique for executing wireless communication between a communication device and a terminal device according to Bluetooth (registered trademark) standard.

BACKGROUND ART

A system for executing communication according to Bluetooth standard and according to Wi-Fi standard between a mobile terminal and a printing device is known. The mobile terminal uses GATT communication of Bluetooth (registered trademark) Low Energy (BLE) scheme to ask the printing device whether the number of Wi-Fi standard wireless connections established by the printing device (i.e., the number of other terminals that have established a wireless connection with the printing device) has reached an upper limit. The mobile terminal displays a confirmation screen for confirming with a user whether to establish a Wi-Fi standard wireless connection with the printing device in the case where the number of wireless connections with the printing device has reached the upper limit.

SUMMARY

In the above technique, in order for the mobile terminal to notify the printing device whether the number of wireless connections of the Wi-Fi standard in the printing device has reached the upper limit, it is necessary to establish a BLE standard wireless connection for executing GATT communication between the mobile terminal and the printing device. The present disclosure provides a technique which can immediately notify a terminal device of the state of a communication device.

A communication device disclosed in the disclosure may comprise: a first wireless interface configured to execute wireless communication according to Bluetooth standard; a second wireless interface configured to execute wireless communication according to Wi-Fi standard; and a controller configured to: in a case where a state of the communication device is a respondent state, cause the first wireless interface to send a first signal, the respondent state being a state in which a Wi-Fi connection that is a wireless connection via the second wireless interface is able to be established between the communication device and a terminal device, and the first signal being sent from the first wireless interface before a Bluetooth connection that is a wireless connection via the first wireless interface is established between the communication device and the terminal device; and in a case where a state of the communication device is a non-respondent state, cause the first wireless interface to send a second signal different from the first signal, the non-respondent state being a state in which the Wi-Fi connection is not able to be established between the communication device and the terminal device, and the second signal being sent from the first wireless interface before the Bluetooth connection is established between the communication device and the terminal device.

A non-transitory computer-readable recording medium storing computer-readable instructions for a terminal device is disclosed in the disclosure. The terminal device may comprise: a first wireless interface configured to execute wireless communication according to Bluetooth standard; a second wireless interface configured to execute wireless communication according to Wi-Fi standard; a display unit; and a processor, wherein the computer-readable instructions, when executed by the processor, cause the terminal device to: in a case where a state of a first communication device is a respondent state, receive a first signal from the first communication device via the first wireless interface, the first communication device being one of a plurality of communication devices that exists around the terminal device, the respondent state being a state in which a Wi-Fi connection that is a wireless connection via the second wireless interface is able to be established between the first communication device and the terminal device, the first signal being received via the first wireless interface before a Bluetooth connection that is a wireless connection via the first wireless interface is established between the first communication device and the terminal device; in a case where a state of a second communication device different from the first communication device among the plurality of communication devices is a non-respondent state, receive a second signal different from the first signal from the second communication device via the first wireless interface, the non-respondent state being a state in which the Wi-Fi connection is not able to be established between the second communication device and the terminal device, and the second signal being received via the first wireless interface before the Bluetooth connection is established between the second communication device and the terminal device; and display on the display unit first device information related to the first communication device that is a sender of the first signal preferentially over second device information related to the second communication device that is a sender of the second signal.

A computer program for implementing the above communication device, a computer-readable recording medium storing the computer program, and a method implemented by the above communication device are also novel and useful. A computer-readable recording medium storing the computer program of the above terminal device, the above terminal device itself, and a method implemented by the above terminal device are also novel and useful. Moreover, a system comprising the above communication device and the above terminal device is also novel and useful.

BRIEF DESCRIPTION OF THE DRAWINGS

EMBODIMENTS (Configuration of Communication System 2; FIG. 1)
As shown in FIG. 1, a communication system 2 comprises a group of terminals 10 constituted of a plurality of terminals including a terminal 10A, etc., a plurality of access points 50A, 50B, and a group of printers 100 constituted of a plurality of printers including a printer 100A, etc. In the present embodiment, a user causes any printer included in the group of printers 100 to execute printing by using the terminal 10A.

Figure 1:
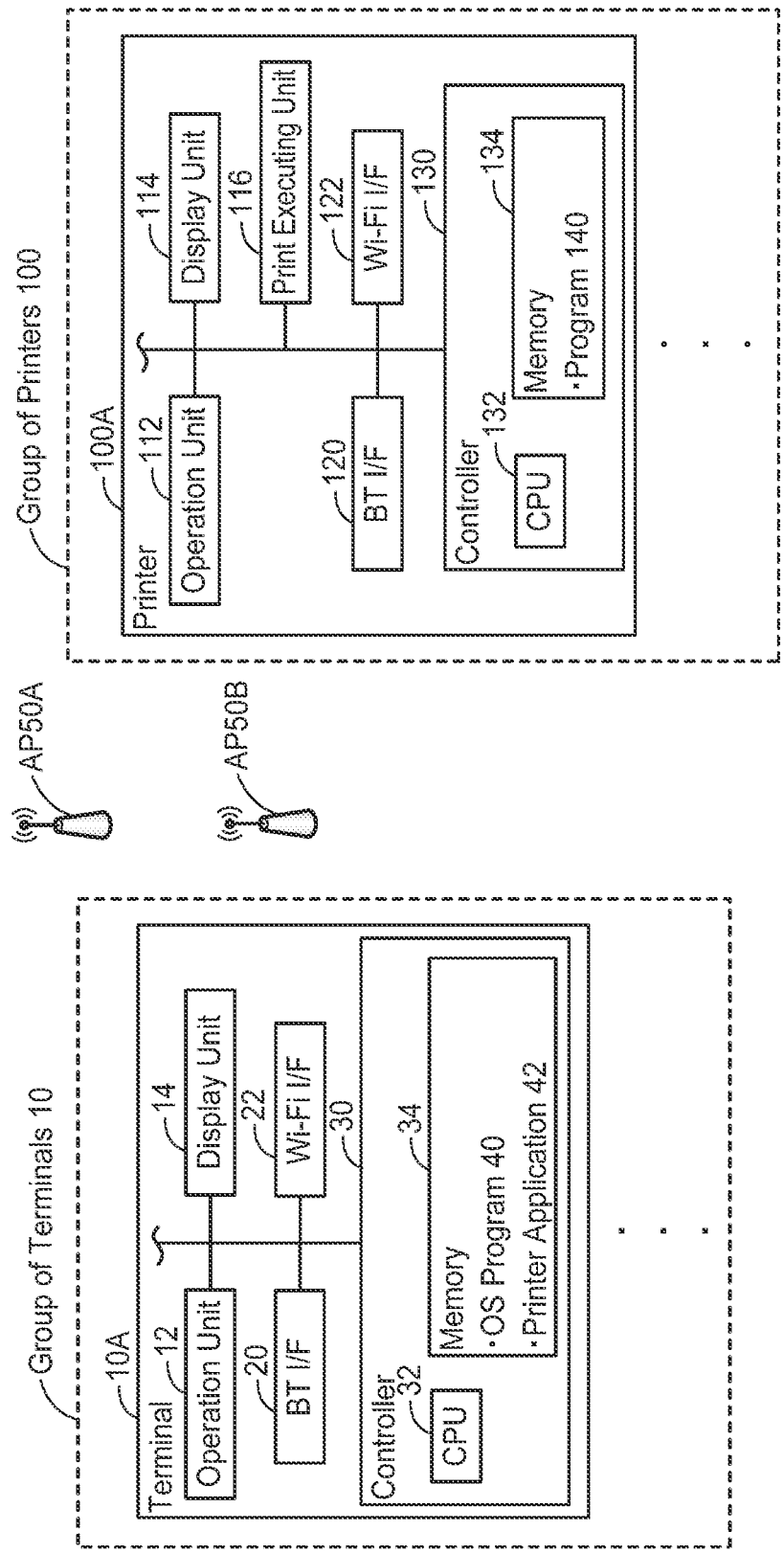
FIG. 1 shows a configuration of a communication system.

The terminal 10A particularly executes wireless communication according to Bluetooth Low Energy (BLE) scheme of the Bluetooth (BT, registered trademark) standard (called "BLE communication" below) with each printer, and displays a selection screen for selecting a printer that is to execute printing. Then, in the case where a printer is selected in the selection screen, the terminal 10A uses a wireless communication according to the Wi-Fi standard (called "Wi-Fi communication" below) to send print data representing an image to be printed to the selected printer. The reason that the terminal 10A sends the print data to the printer using Wi-Fi communication instead of BLE communication is that a communication speed of Wi-Fi communication is usually faster than a communication speed of BLE communication.

Below, an access point is termed an "AP". Each AP 50A, 50B is a common AP called a wireless LAN access point, wireless LAN router, Wi-Fi router, or the like. Each AP 50A, 50B is not a parent station (i.e., SoftAP, Group Owner, etc.) of a so-called SoftAP scheme, Wi-Fi Direct (WFD, registered trademark) scheme, or the like.

(Configuration of Terminal 10A)
A configuration of the terminal 10A of the group of terminals 10 will be described. The other terminals in the group of terminals 10 comprise the same configuration as the terminal 10A. The terminal 10A is a portable terminal device such as a mobile phone (e.g., a smartphone), a PDA, a tablet PC, etc. The terminal 10A comprises an operation unit 12, a display unit 14, a Bluetooth (BT, registered trademark) interface 20, a Wi-Fi interface 22, and a controller 30. The units 12 to 30 are connected to a bus line (reference number omitted).

The operation unit 12 comprises one or more buttons. The operation unit 12 is configured to receive various instructions from the user. The display unit 14 is a display for displaying various types of information. The display unit 14 also functions as a touch screen (i.e., operation unit) that receives instructions from the user.

Below, an interface is termed "I/F". The BT I/F 20 is a wireless I/F for executing BLE communication. The BLE scheme is a wireless communication scheme based on IEEE 802.15.1 and standards conforming thereto and, particularly, is a scheme implemented in version 4.0 or later of the BT standard. The BT I/F 20 is configured to execute communication of various signals defined by the BLE scheme. In the present embodiment, the BT I/F 20 is configured to execute communication of an ADV_IND signal, an ADV_NONCONN_IND signal, and a CONNECT_IND signal.

Each of the aforementioned signals is a signal communicated before a wireless connection according to the BT standard (termed "BT connection" below) is established. The BT connection can also be referred to as Logical Link Control and Application Protocol (L2CAP) Link. The ADV_IND signal is a signal for notifying that a BT connection can be established. The ADV_NONCONN_IND signal is a signal for notifying that a BT connection cannot be established. The CONNECT_IND signal is a signal communicated after the ADV_IND signal, and is a signal for establishing a BT connection.

The Wi-Fi I/F 22 is a wireless I/F for executing Wi-Fi communication. The Wi-Fi standard is a wireless communication standard based on the Institute of Electrical and Electronics Engineers, Inc. (IEEE) standard 802.11 and standards conforming thereto (e.g., 802.11a, 11b, 11g, 11n, 11ac, etc.). The terminal 10A establishes a wireless connection (termed "AP connection" below) with an AP (e.g., 50A) via the Wi-Fi I/F 22, and can belong as a child station to a wireless network (termed "APNW" below) in which the AP operates as a parent station.

The Wi-Fi I/F 22 supports, in particular, the WFD scheme formulated by the Wi-Fi Alliance. The WFD scheme is a wireless communication scheme described in the standard document "Wi-Fi Peer-to-Peer (P2P) Technical Specification Version 1.1" created by the Wi-Fi Alliance. The terminal 10A establishes a wireless connection (termed "WFD connection" below) with a printer (e.g., 100A) via the Wi-Fi I/F 22, and can belong as a child station (i.e., client of the WFD scheme) to a wireless network (termed "WFDNW" below) in which the printer operates as a parent station (i.e., Group Owner of the WFD scheme). Below, a Group Owner and a client are termed "G/O", "CL", respectively.

Differences between Wi-Fi communication and BLE communication will be described. The communication speed of Wi-Fi communication (e.g., maximum communication speed is 600 Mbps) is faster than the communication speed of BLE communication (e.g., maximum communication speed is 24 Mbps). A frequency of a carrier wave in the Wi-Fi communication is a 2.4 GHz band or 5.0 GHz band. A frequency of a carrier wave in the BLE communication is the 2.4 GHz band. Further, a maximum distance at which the Wi-Fi communication can be executed (e.g., about 100 meters) is greater than a maximum distance at which the BLE communication can be executed (e.g., about several tens of meters).

The controller 30 comprises a CPU 32 and a memory 34. The CPU 32 executes various processes in accordance with programs 40, 42 stored in the memory 34. The memory 34 is configured of a volatile memory, a non-volatile memory, and the like, and stores an Operating System (OS) program 40 (simply termed "OS 40" below) and a printer application 42 (simply termed "application 42" below).

The OS 40 is a program for controlling basic operations of the terminal 10A and is, e.g., iOS (registered trademark) or Android (registered trademark). The application 42 is an application for executing BT communication with the group of printers 100 and displaying the aforementioned selection screen, and for sending print data to the selected printer. The application 42 may be, e.g., installed on the terminal 10A from a server on the Internet provided by a vendor of the group of printers 100, or installed on the terminal 10A from a medium shipped with any of the printers.

(Configuration of Printer 100A)
The configuration of the printer 100A among the group of printers 100 will be described. The other printers among the group of printers 100 comprise the same configuration as the printer 100A. The printer 100A is a peripheral device (e.g., a peripheral device of the terminal 10A) configured to execute a printing function. The printer 100A comprises an operation unit 112, a display unit 114, a print executing unit 116, a BT I/F 120, a Wi-Fi I/F 122, and a controller 130.

The operation unit 112 comprises one or more buttons. The operation unit 112 is configured to receive various instructions from the user. The display unit 114 is a display for displaying various types of information. The display unit 114 also functions as a touch screen (i.e., operation unit) that receives instructions from the user. The print executing unit 116 comprises a printing mechanism of an ink jet scheme, a laser scheme, or the like.

The BT I/F 120 is the same as the BT I/F 20 of the terminal 10A. That is, the BT I/F 120 supports the BLE scheme. The Wi-Fi I/F 122 is the same as the Wi-Fi I/F 22 of the terminal 10A. That is, the Wi-Fi I/F 122 supports the WFD scheme.

The printer 100A can establish an AP connection with an AP (e.g., 50A) via the Wi-Fi I/F 122, and belong as a child station to an APNW in which the AP operates as a parent station. Further, when the power of the printer 100A is turned ON, the printer 100A operates as a G/O of the WFD scheme. The printer 100A can establish a WFD connection with a terminal (e.g., 10A) via the Wi-Fi I/F 122, and cause the terminal to belong as a child station (i.e., CL) to a WFDNW in which the printer 100A operates as a parent station (i.e., G/O). An upper limit of the number of child stations that can belong to the WFDNW in which the printer 100A operates as a parent station is predetermined, and is "2" in the present embodiment. In a variant, the upper limit may be "1", or an integer of "3" or more.

The controller 130 comprises a CPU 132 and a memory 134. The CPU 132 executes various processes in accordance with a program 140 stored in the memory 134. The memory 134 is configured of a volatile memory, a non-volatile memory, and the like.

Figure 2:
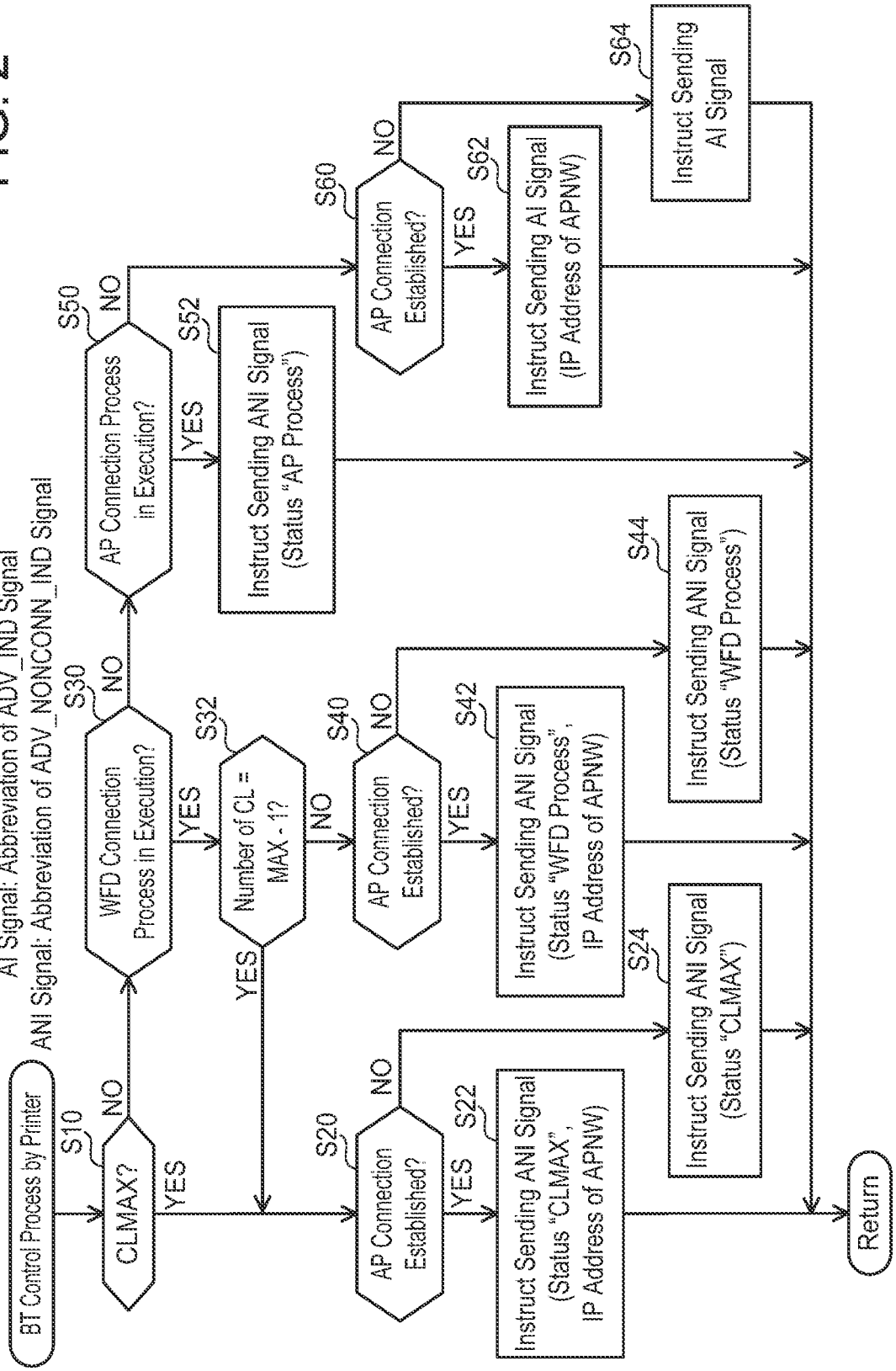
FIG. 2 shows a flowchart of a BT control process of a printer.

(BT Control Process by Printer 100A: FIG. 2)
A BT control process executed by the CPU 132 of the printer 100A will be described with reference to FIG. 2. The other printers in the group of printers 100 execute the BT control process in the same way as the printer 100A. The BT control process is started with the power of the printer 100A being turned ON as the trigger.

In S10, the CPU 132 determines whether the number of CL currently belonging to the WFDNW in which the printer 100A operates as a G/O is equal to the upper limit (i.e., "2"). When a CL belongs to the WFDNW, the CPU 132 stores information of that CL (e.g., MAC address) in the memory 134, and when a CL leaves the WFDNW, the CPU 132 deletes the information of that CL from the memory 134. In the case where the number of items of CL information stored in the memory 134 is "2", the CPU 132 determines that the number of CL is equal to the upper limit (YES in S10), and proceeds to S20. In the case where the number of items of CL information is "0" or "1", the CPU 132 determines that the number of CL is not equal to the upper limit (NO in S10), and proceeds to S30.

In S20, the CPU 132 determines whether the printer 100A has established an AP connection with any AP (e.g., 50A). That is, the CPU 132 determines whether the printer 100A currently belongs to the APNW as a child station. When the printer 100A belongs to the APNW, the CPU 132 stores in the memory 134 belonging information indicating that the printer 100A belongs to the APNW. When the printer 100A leaves the APNW, the CPU 132 stores, in the memory 134, non-belonging information indicating that the printer 100A does not belong to the APNW. In the case where the belonging information is stored in the memory 134, the CPU 132 determines that an AP connection has been established (YES in S20), and proceeds to S22. In the case where the non-belonging information is stored in the memory 134, the CPU 132 determines that an AP connection has not been established (NO in S20), and proceeds to S24.

In S22, the CPU 132 instructs the BT OF 120 to send the ADV_NONCONN_IND signal (termed "ANI signal" below) including status information "CLMAX" and an IP address "IPA" of the printer 100A to be used in the APNW to which the printer 100A currently belongs. Thereby, the BT OF 120 repeatedly sends this ANI signal. In the later described processes of S24, S42, S44, S62, and S64 as well, the BT OF 120 repeatedly sends a signal in response to the instruction to the BT OF 120. Although not shown in S22, the ANI signal further includes a model name "AAA" of the printer 100A. This point is the same for the ANI signal and ADV_IND signal below.

The status information "CLMAX" is information indicating that the number of CL currently belonging to the WFDNW in which the printer 100A operates as a G/O is equal to the upper limit. In the case where the printer 100A is CLMAX, the printer 100A cannot newly establish a WFD connection with the terminal 10A. For this reason, in the case of being CLMAX (YES in S10), the printer 100A notifies the terminal 10A that the WFD connection cannot be established by sending the ANI signal.

The IP address "IPA" is assigned by, e.g., an AP when the printer 100A belongs to the APNW, and is stored in the memory 134. In S22, the CPU 132 acquires the IP address "IPA" from the memory 134, and instructs the BT OF 120 to send an AM signal including the acquired IP address "IPA". Since the ANI signal includes the IP address "IPA" of the printer 100A, the terminal 10A can know that the printer 100A belongs to the APNW and determine whether the terminal 10A and the printer 100A belong to the same APNW by using the IP address "IPA". When S22 ends, the process returns to S10.

In S24, the CPU 132 instructs the BT OF 120 to send an ANI signal including the status information "CLMAX". This ANI signal does not include the IP address of the printer 100A. When S24 ends, the process returns to S10.

In S30, the CPU 132 determines whether the printer 100A is executing a process for establishing a WFD connection (termed "WFD process" below) with any terminal. The WFD process is a process executed between receipt of a CONNECT_IND signal from any terminal in response to sending of an ADV_IND signal and establishment of a WFD connection with the terminal. In the case where the WFD process is in execution, the CPU 132 determines YES in S30 and proceeds to S32, while determines NO in S30 and proceeds to S50 in the case where the WFD process is not in execution.

In S32, the CPU 132 determines whether the number of CL currently belonging to the WFDNW in which the printer 100A operates as a G/O is equal to "upper limit −1 (i.e., "1")". In the case where the number of items of CL information stored in the memory 134 is "1", the CPU 132 determines that the number of CL is equal to "upper limit −1" (YES in S32), and proceeds to S20. In the case where the number of items of CL information is "0", the CPU 132 determines that the number of CL is not equal to "upper limit −1" (NO in S32), and proceeds to S40.

S40 is the same as S20. The CPU 132 proceeds to S42 in the case of determining that the AP connection has been established (YES in S40), while proceeds to S44 in the case of determining that the AP connection has not been established (NO in S40).

In S42, the CPU 132 instructs the BT I/F 20 to send an ANI signal including status information "WFD process", and the IP address "IPA" of the printer 100A to be used in the APNW to which the printer 100A currently belongs. The status information "WFD process" is information indicating that the printer 100A is executing the WFD process. In the case where the printer 100A is executing the WFD process, the printer 100A cannot newly establish a WFD connection with the terminal 10A until that WFD process ends. For this reason, in the case where the printer 100A is executing the WFD process (YES in S30), the printer 100A notifies the terminal 10A that the WFD connection cannot be established by sending the ANI signal. When S42 ends, the process returns to S10.

In S44, the CPU 132 instructs the BT I/F 120 to send an ANI signal including the status information "WFD process". This ANI signal does not include the IP address of the printer 100A. When S44 ends, the process returns to S10.

In S50, the CPU 132 determines whether the printer 100A is executing a process for establishing an AP connection (termed "AP process" below) with any AP. The AP process is a process executed between receipt of an instruction for establishing an AP connection by the operation unit 112 and establishment of an AP connection. The CPU 132 determines YES in S50 and proceeds to S52 in the case where the AP process is in execution, while determines NO in S50 and proceeds to S60 in the case where the AP process is not in execution.

In S52, the CPU 132 instructs the BT I/F 120 to send an ANI signal including the status information "AP process". The status information "AP process" is information indicating that the printer 100A is executing the AP process. In the case where the printer 100A is executing the AP process, the printer 100A cannot establish a WFD connection with the terminal 10A until that AP process ends. For this reason, in the case where the printer 100A is executing the AP process (YES in S50), the printer 100A notifies the terminal 10A that the WFD connection cannot be established by sending the ANI signal. When S52 ends, the process returns to S10.

S60 is the same as S20. The CPU 132 proceeds to S62 in the case of determining that the AP connection has been established (YES in S60), while proceeds to S64 in the case of determining that the AP connection has not been established (NO in S60).

In S62, the CPU 132 instructs the BT OF 20 to send an ADV_IND signal (termed "AI signal" below) including the IP address "IPA" of the printer 100A to be used in the APNW to which the printer 100A currently belongs. In the case where the printer 100A is not CLMAX or not executing either of the WFD process or the AP process (NO in S10, NO in S30, NO in S50), the printer 100A can immediately establish a WFD connection with the terminal 10A. For this reason, the printer 100A notifies the terminal 10A that the WFD connection can be established by sending the AI signal. When S62 ends, the process returns to S10.

In S64, the CPU 132 instructs the BT OF 120 to send an AI signal. The AI signal does not include the IP address of the printer 100A. When S64 ends, the process returns to S10.

Figure 3:
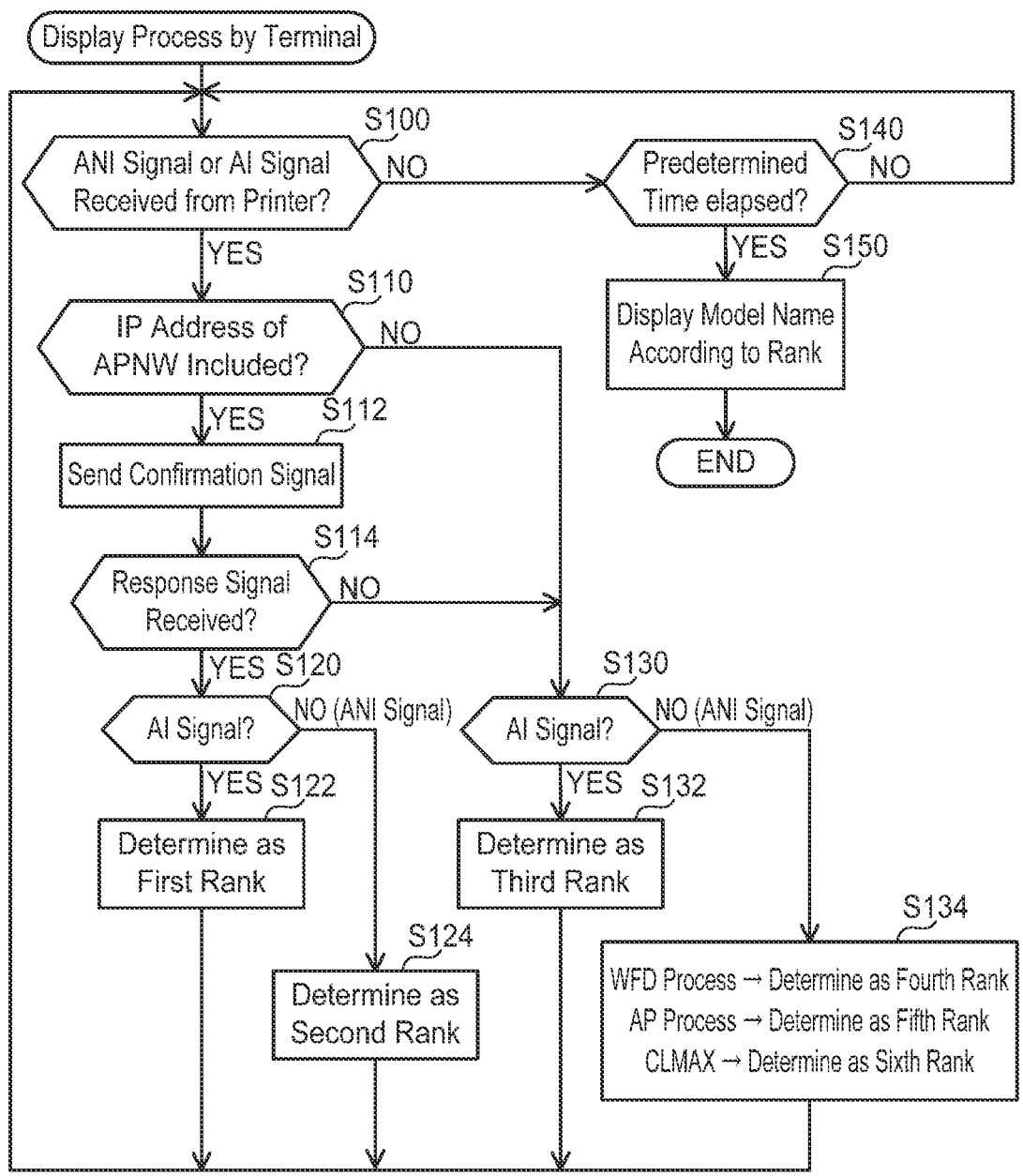
FIG. 3 shows a flowchart of a display process of a terminal.

(Display Process by Terminal 10A: FIG. 3)

A display process executed by the CPU 32 of the terminal 10A will be described with reference to FIG. 3. The display process is implemented by the CPU 32 executing the application 42. The display process is started with the activation of the application 42 as a trigger.

In S100, the CPU 32 monitors receipt of an ANI signal or AI signal from any printer via the BT OF 20. In the case where an ANI signal or AI signal is received, the CPU 32 determines YES in S100, and proceeds to S110. Below, the signal received in S100 is termed "target signal".

In S110, the CPU 32 determines whether the target signal includes an IP address. The CPU 32 proceeds to S112 in the case of determining that the target signal includes an IP address (YES in S110), while proceeds to S130 in the case of determining that the target signal does not include an IP address (NO in S110).

In S112, the CPU 32 instructs the Wi-Fi OF 22 to send a confirmation signal including the IP address included in the target signal as the destination address. In the case where the Wi-Fi OF 22 has established an AP connection with any AP, the Wi-Fi OF 22 sends the confirmation signal to that AP. In the case where the Wi-Fi OF 22 has not established an AP connection with any AP, the Wi-Fi OF 22 does not send a confirmation signal. The confirmation signal is, e.g., a PING signal.

In S114, the CPU 32 determines whether a response signal has been received via the Wi-Fi OF 22 in response to the instruction to the Wi-Fi OF 22 in S112. In the case where a response signal has been received, the CPU 32 determines YES in S114, and proceeds to S120. Receiving a response signal means that the terminal 10A and the printer that has sent the target signal belong to the same APNW. On the other hand, in the case where a response signal has not been received even after a predetermined time has elapsed since the sending of the confirmation signal, the CPU 32 determines NO in S114, and proceeds to S130.

In S120, the CPU 32 determines whether the target signal is an AI signal. The CPU 32 determines YES in S120 and proceeds to S122 in the case where the target signal is an AI signal, while determines NO in S120 and proceeds to S124 in the case where the target signal is an ANI signal.

In S122, the CPU 32 stores a model name included in the target signal and a first rank in association with each other in the memory 34. The smaller the rank number, the higher the rank. That is, the first rank is the highest rank and, in the present embodiment, the sixth rank is the lowest rank. It can be said that the ranks indicate ranks of printers capable of executing printing immediately. When S122 ends, the process returns to S100.

In S124, the CPU 32 stores the model name included in the target signal and the second rank in association with each other in the memory 34. When S124 ends, the process returns to S100.

Here, the reason why the rank of S122 is higher than the rank of S124 will be described. The printer from which the ANI signal is sent is executing the WFD process or the AP process, or has established a WFD connection with two terminals (i.e., CLMAX) (see S22, S24, S42, S44 of FIG. 2). This printer may not be able to immediately start printing in response to a request from the terminal 10A. This is because, in the case where the WFD process or the AP process is in execution, printing is started after this process ends. Further, in the case of CLMAX, this is because it is possible that printing is in execution in response to a request from another terminal, and it is necessary to wait until this printing ends. On the other hand, it is highly likely that the printer from which the AI signal is sent can immediately start printing in response to a request from the terminal 10A. For this reason, the rank of the printer from which the AI signal is sent (i.e., the rank of S122) is higher than the rank of the printer from which the ANI signal is sent (i.e., the rank of S124).

S130 is the same as S120. The CPU 32 determines YES in S130 and proceeds to S132 in the case where the target signal is an AI signal, while determines NO in S130 and proceeds to S134 in the case where the target signal is an ANI signal.

In S132, the CPU 32 stores the model name included in the target signal and the third rank in association with each other in the memory 34. When S132 ends, the process returns to S100.

In S134, the CPU 32 confirms the status information included in the target signal and determines the rank. The CPU 32 determines as the fourth rank in the case where the status information is "WFD process", determines as the fifth rank in the case where the status information is "AP process", and determines as the sixth rank in the case where the status information is "CLMAX". Then, the CPU 32 stores the model name included in the target signal and the determined rank in association with each other in the memory 34. When S134 ends, the process returns to S100.

Here, the reason why the ranks of S122 and S124 are higher than the ranks of S132 and S134 will be described. In the case where the terminal 10A and the printer from which the target signal is sent belong to the same APNW (i.e., YES in S114), the terminal 10A and the printer can execute communication of print data by using the APNW (i.e., via the AP) without establishing a WFD connection. For this reason, the printer can immediately receive print data from the terminal 10A and, consequently, can immediately execute printing. On the other hand, in the case where the terminal 10A and the printer sending the target signal do not belong to the same APNW (i.e., NO in S110 or NO in S114), the terminal 10A and the printer execute communication of print data by using a WFDNW after establishing a WFD connection. Therefore, time is needed to execute the process of establishing the WFD connection. For this reason, the ranks of printers belonging to the same APNW as the terminal 10A (i.e., the rank of S122 and S124) are higher than the ranks of printers not belonging to the same APNW as the terminal 10A (i.e., the ranks of S132 and S134).

Further, the reason why the rank of S132 is higher than the rank of S134 is as follows. In the case where the printer from which the ANI signal is sent is executing the WFD process or the AP process, the printer cannot establish a WFD connection with the terminal 10A unless the process ends. Further, in the case where the printer from which the ANI signal is sent is CLMAX, the printer cannot establish a WFD connection with the terminal 10A in the first place, and cannot execute communication of print data with the terminal 10A by using the WFDNW. On the other hand, it is highly likely that the printer from which the AI signal is sent can immediately start the WFD process for establishing a WFD connection with the terminal 10A. For this reason, the rank of the printer from which the AI signal is sent (i.e., the rank of S132) is higher than the rank of the printer from which the ANI signal is sent (i.e., the rank of S134).

The reason for determining each rank of S134 as described above is as follows. The time required for the WFD process is usually shorter than the time required for the AP process. For this reason, the rank corresponding to the WFD process (i.e., fourth rank) is higher than the rank corresponding to the AP process (i.e., fifth rank). Further, as described above, the printer which is CLMAX cannot execute communication of print data with the terminal 10A. For this reason, the rank corresponding to the WFD process or the AP process (i.e., fourth or fifth rank) is higher than the rank corresponding to the CLMAX (i.e., sixth rank).

In S140, the CPU 32 monitors whether a predetermined time has elapsed since the application 42 was activated. In the case where the predetermined time has elapsed, the CPU 32 determines YES in S140, and proceeds to S150.

In S150, the CPU 32 displays a selection screen including model names on the display unit 14 according to the information stored in the memory 34 in S122, etc. Specifically, the CPU 32 generates a selection screen such that the model name associated with the higher rank is positioned at the upper portion, and displays the generated selection screen on the display unit 14. Further, the CPU 32 displays the status information in association with each model name. Specifically, the CPU 32 displays a character string "Same NW" in association with the first rank and/or second rank model name. The CPU 32 displays a character string "Waiting" in association with the third rank model name, displays a character string "Executing WFD Process" in association with the fourth rank model name, displays a character string "Executing AP Process" in association with the fifth rank model name, and displays a character string "CLMAX" in association with the sixth rank model name. When S150 ends, the display process of FIG. 3 ends.

Figure 4:
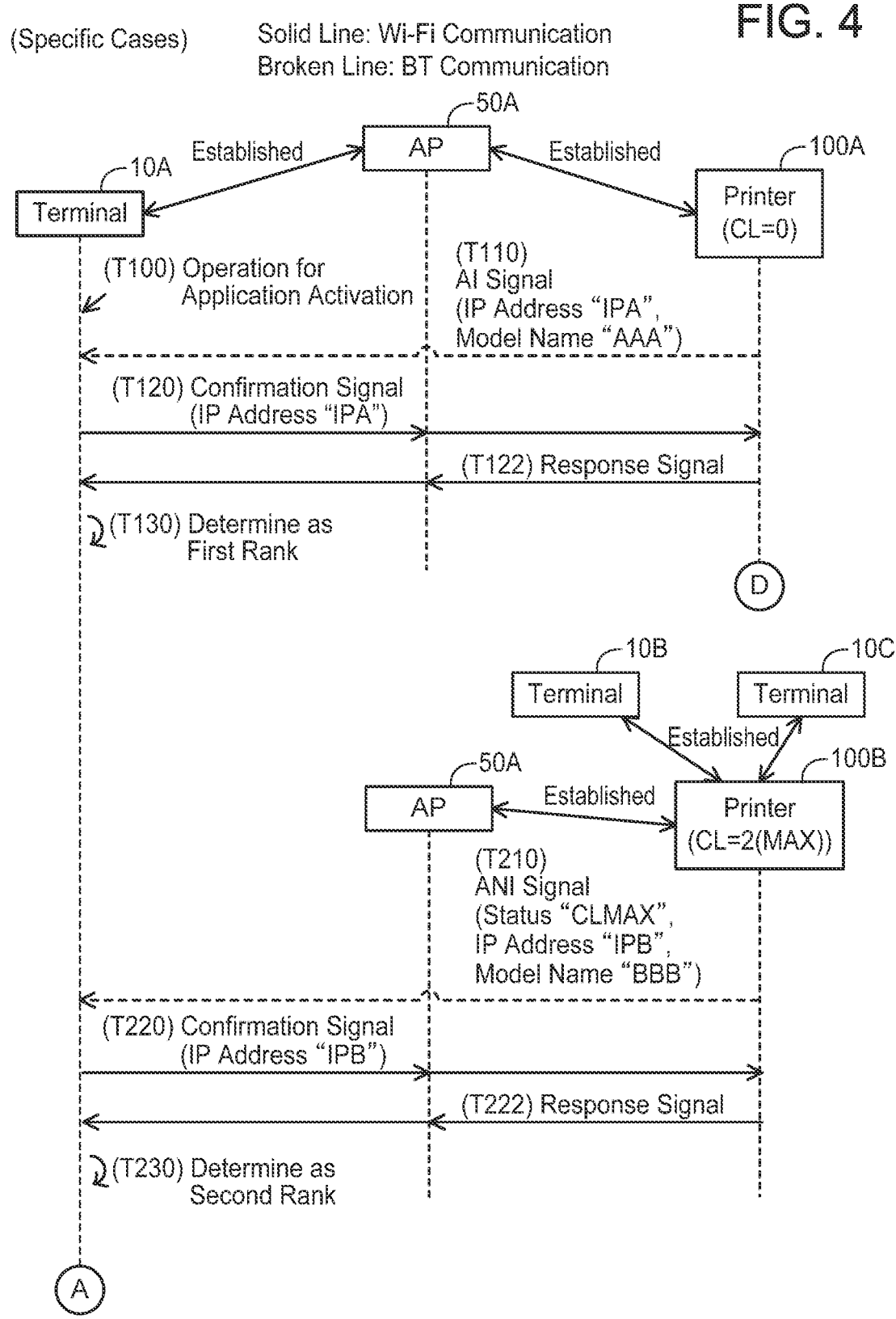
FIG. 4 shows a sequence diagram of a specific case.

(Specific Cases: FIG. 4)

Next, specific cases executed by the terminal 10A and the plurality of printers 100A to 100F included in the group of printers 100 will be described with reference to FIGS. 4 to 7. The processes of FIGS. 4 to 7 are chiefly implemented by the processes of FIGS. 2 and 3. In FIGS. 4 to 7, BT communication and Wi-Fi communication between devices are represented by a broken line and a solid line, respectively.

The terminal 10A has established an AP connection with the AP 50A. Further, the printer 100A has also established an AP connection with the AP 50A. That is, the terminal 10A and the printer 100A belong to the same APNW. In T100, the terminal 10A receives an operation for application activation (trigger for the process of FIG. 3).

The printer 100A has not established a WFD connection with any terminal (NO in S10 of FIG. 2), is not executing a WFD process (NO in S30), or is not executing an AP process (NO in S50). For this reason, in T110 the printer 100A sends an AI signal including an IP address "IPA" of the printer 100A and a model name "AAA" of the printer 100A (YES in S60, S62).

When receiving the AI signal from the printer 100A (YES in S100 of FIG. 3), the terminal 10A determines that the AI signal includes the IP address "IPA" (YES in S110) and, in T120, sends to the AP 50A a confirmation signal including the IP address "IPA" as the destination address (S112).

When receiving the confirmation signal from the terminal 10A via the AP 50A in T120, the printer 100A sends a response signal to the terminal 10A via the AP 50A in T122 (a process different from FIG. 3).

When receiving the response signal from the printer 100A via the AP 50A in T122 (YES in S114), the terminal 10A stores the model name "AAA" and the first rank in association with each other in T130 (YES in S120, S122).

The printer 100B has also established an AP connection with the AP 50A. The printer 100B has also established a WFD connection with each of two terminals 10B, 10C. That is, the printer 100B is CLMAX (YES in S10 of FIG. 2). For this reason, in T210, the printer 100B sends an ANI signal including the status information "CLMAX", an IP address "IPB" of the printer 100B, and a model name "BBB" of the printer 100B (YES in S20, S22).

Figure 5:
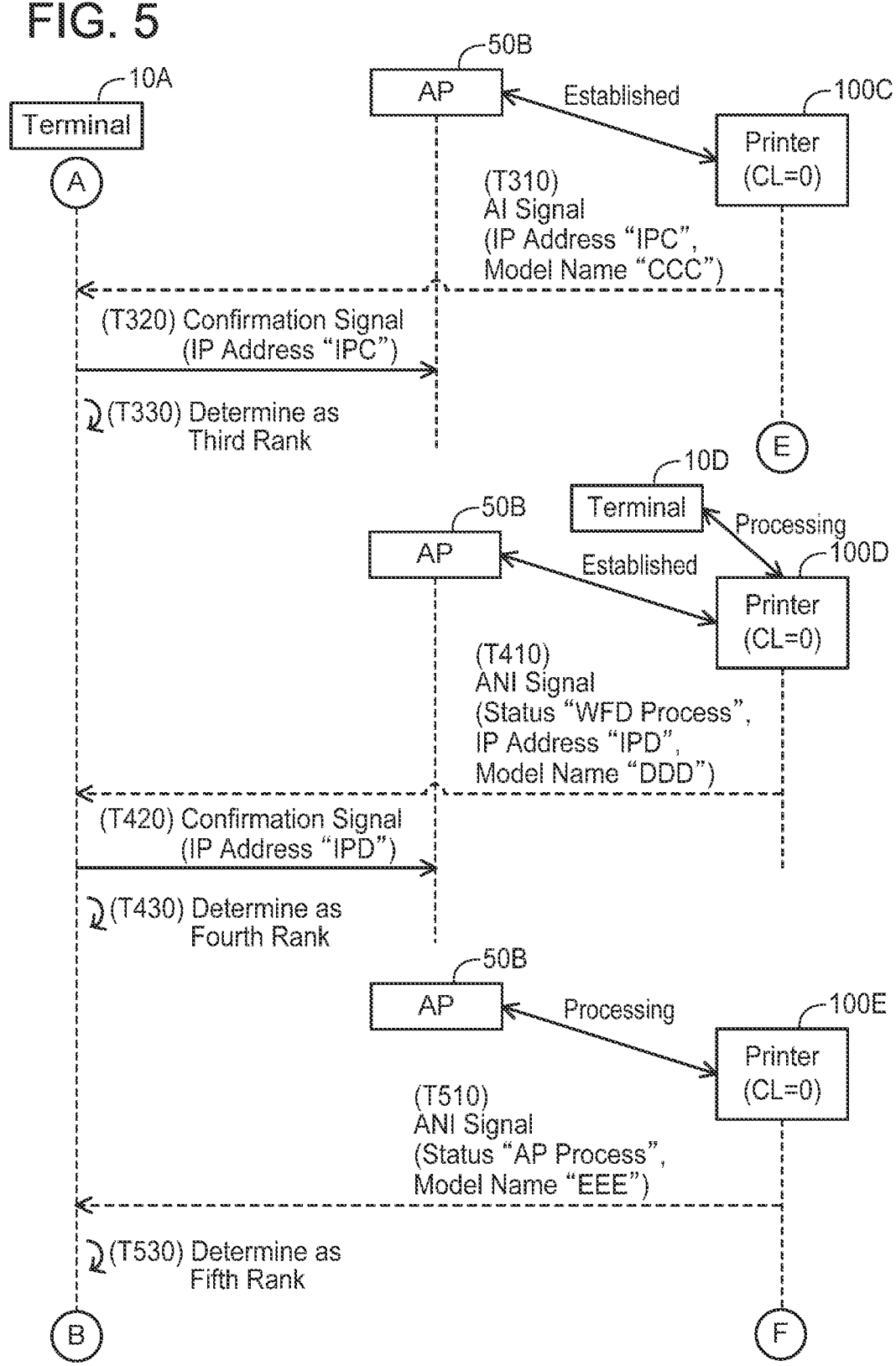
FIG. 5 shows a sequence diagram of a continuation of FIG. 4.

T220 and T222 are the same as T120 and T122 except that the printer 100B is used instead of the printer 100A. When receiving the response signal from the printer 100B via the AP 50A in T222 (YES in S114 of FIG. 3), the terminal 10A stores the model name "BBB" and the second rank in association with each other in T230 (NO in S120, S124).
(Continuation of FIG. 4: FIG. 5)
As shown in FIG. 5, a printer 100C has established an AP connection with an AP 50B that is different from the AP 50A. That is, the printer 100C belongs to an APNW that is different from the APNW to which the terminal 10A belongs. In T310, the printer 100C sends an AI signal including an IP address "IPC" of the printer 100C, and a model name "CCC" of the printer 100C (NO in S10, NO in S30, NO in S50, YES in S60, S62 of FIG. 2).

When receiving the AI signal from the printer 100C in T310 (YES in S100 of FIG. 3), the terminal 10A sends to the AP 50B a confirmation signal including the IP address "IPC" as the destination address in T320 (YES in S110, S112). Then, the terminal 10A determines that a response signal has not been received (NO in S114), and stores the model name "CCC" and the third rank in association with each other in T330 (YES in S130, S132).

A printer 100D has also established an AP connection with the AP 50B that is different from the AP 50A. The printer 100D is executing a WFD process for establishing a WFD connection with a terminal 10D (NO in S10, YES in S30 of FIG. 2). For this reason, in T410, the printer 100D sends an ANI signal including status information "WFD process", an IP address "IPD" of the printer 100D, and a model name "DDD" of the printer 100D (NO in S32, YES in S40, S42).

When receiving the ANI signal from the printer 100D in T410 (YES in S100 of FIG. 3), the terminal 10A sends to the AP 50B a confirmation signal including the IP address "IPD" as the destination address in T420 (YES in S110, S112). Then, the terminal 10A determines that a response signal has not been received (NO in S114), and stores the model name "DDD" and the fourth rank corresponding to the status information "WFD process" in association with each other in T430 (NO in S130, S134).

A printer 100E is executing an AP process for establishing an AP connection with the AP 50B (NO in S10, NO in S30, YES in S50). For this reason, in T510 the printer 100E sends an ANI signal including status information "AP process" and a model name "EEE" of the printer 100E (S52).

Figure 6:
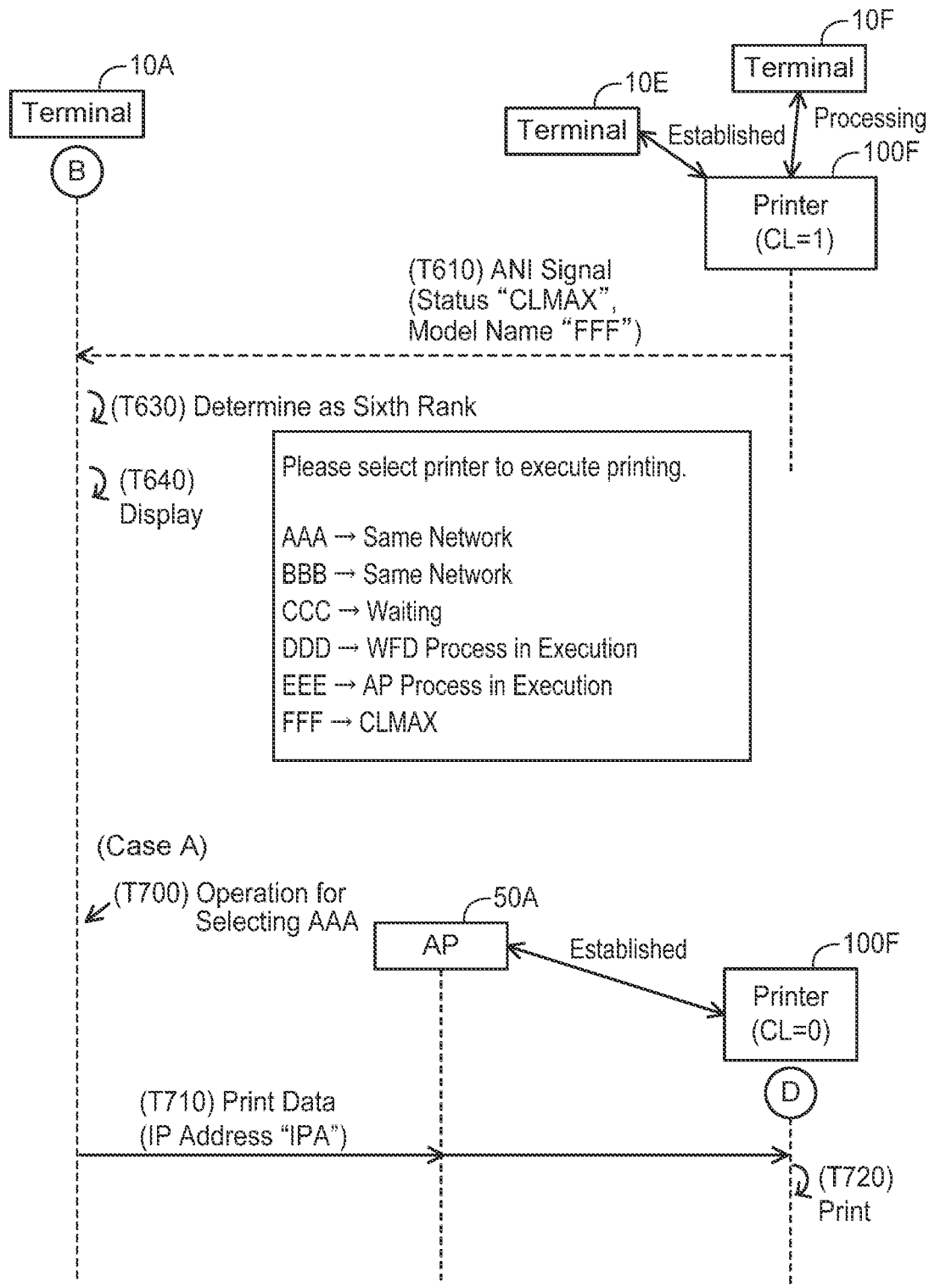
FIG. 6 shows a sequence diagram of a continuation of FIG. 5 and Case A in which a model name "AAA" is selected.

When receiving the ANI signal from the printer 100E in T510 (YES in S100 of FIG. 3), the terminal 10A stores the model name "EEE" and the fifth rank in accordance with the status information "AP process" in association with each other in T530 (NO in S110, NO in S130, S134).
(Continuation of FIG. 5: FIG. 6)
As shown in FIG. 6, a printer 100F has established a WFD connection with a terminal 10E, and is executing a WFD process for establishing a WFD connection with a terminal 10F (NO in S10, YES in S30). That is, the printer 100F is executing the WFD process in the situation in which the number of CL belonging to the WFDNW in which the printer 100F operates as the G/O is "upper limit −1". For this reason, the printer 100F sends an ANI signal including the status information "CLMAX" and a model name "FFF" of the printer 100F in T610 (YES in S32, NO in S20, S24). As just described, in the situation in which the printer 100F is not CLMAX but will soon become CLMAX (i.e., the situation in which the WFD connection with the terminal 10A cannot be established), the printer 100F sends an ANI signal including the status information "CLMAX". Thereby, selection of the printer 100F, which cannot establish a WFD connection, by the user of the terminal 10A can be prevented.

When receiving the ANI signal from the printer 100F in T610 (YES in S100 of FIG. 3), the terminal 10A stores the model name "FFF" and the sixth rank corresponding to the status information "CLMAX" in association with each other in T630 (NO in S110, NO in S130, S134).

When receiving and processing the AI signals and the ANI signals from all the printers 100A to 100F, the terminal 10A displays a selection screen including each model name "AAA" to "FFF" and its corresponding status information in T640 according to the determined rank (S150). Thereby, the user can know the rank of each printer and the status information of each printer.
(Case A: FIG. 6)
In case A, the terminal 10A accepts selection of the model name "AAA" in the selection screen from the user in T700. In this case, the terminal 10A sends to the printer 100A print data with the IP address "IPA" (see T110 of FIG. 4) as the destination address via the AP 50A in T710 (a process different from FIG. 3).

Figure 7:
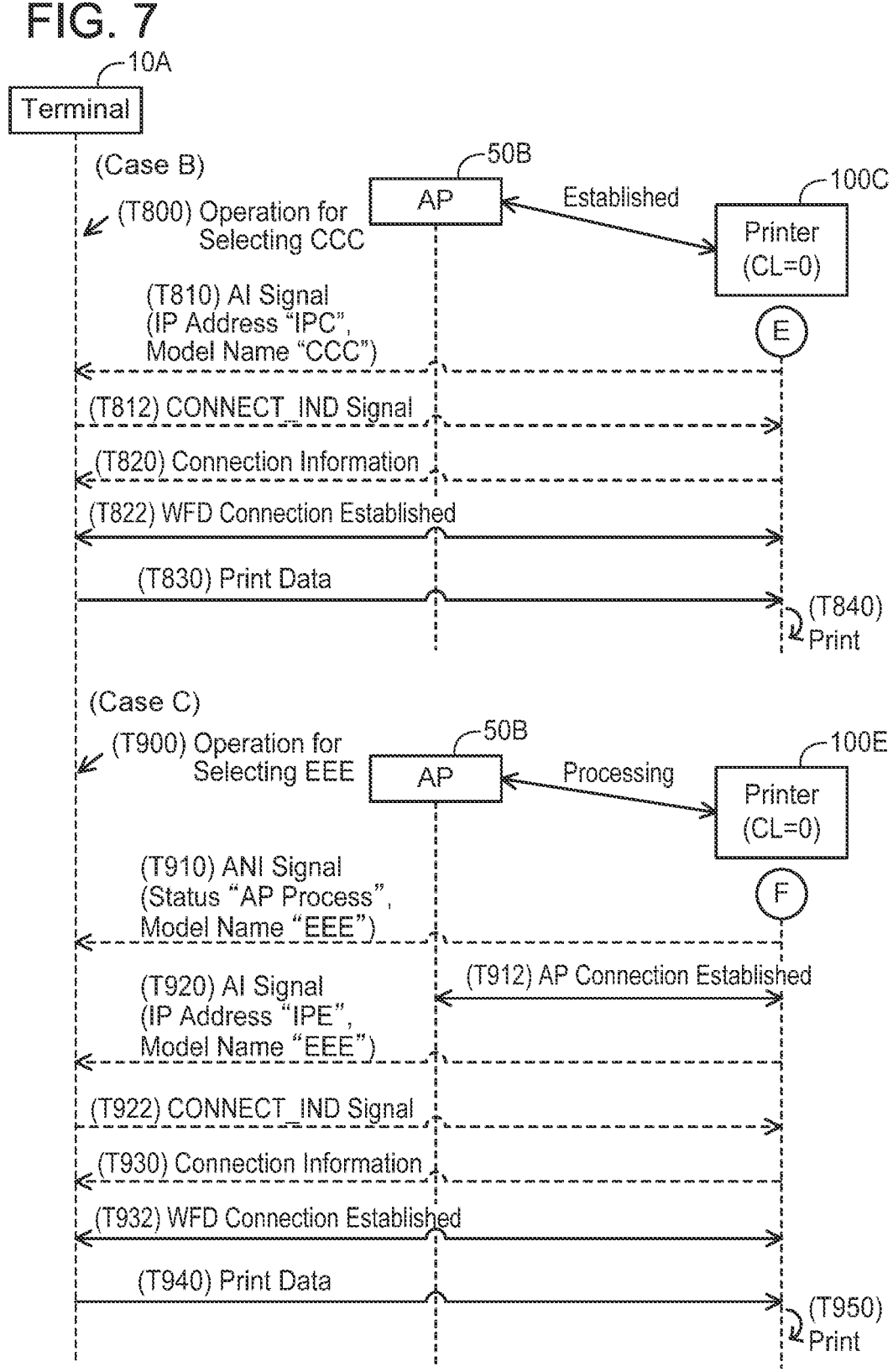
FIG. 7 shows a sequence diagram of Case B in which a model name "CCC" is selected, and Case C in which a model name "EEE" is selected.

When receiving the print data from the terminal 10A via the AP 50A in T710, the printer 100A executes printing of an image represented by the print data in T720 (a process different from FIG. 2).
(Case B: FIG. 7)
As shown in FIG. 7, in Case B, the terminal 10A accepts selection of the model name "CCC" in the selection screen from the user in T800. In this case, the terminal 10A receives an AI signal again from the printer 100C in T810, and sends a CONNECT_IND signal to the printer 100C via the BT OF 20 in T812 (a process different from FIG. 3). As a result, a BT connection is established between the terminal 10A and the printer 100C.

When establishing the BT connection with the terminal 10A, the printer 100C uses the BT connection to send connection information to the terminal 10A in T820 (a process different from FIG. 2). The connection information is information needed to establish a WFD connection with the printer 100C that is the G/O, and includes, e.g., an SSID and a password. As described above, since communication of the connection information is executed between the terminal 10A and the printer 100C by using the BT connection, a WFD connection can be appropriately established between the terminal 10A and the printer 100C. Although not shown, the printer 100C executes the WFD process when receiving the CONNECT_IND signal from the terminal 10A, and therefore sends the ANI signal instead of the AI signal (YES in S30, NO in S32, YES in S40, S42 of FIG. 2).

When receiving the connection information from the printer 100C in T820, the terminal 10A executes various types of communication such as Probe, Authentication, Association, 4-Way Handshake, etc. with the printer 100C via the Wi-Fi OF 22 in T822 (a process different from FIG. 3). In this process, connection information is sent to the printer 100C from the terminal 10A, and authentication of the connection information is executed by the printer 100C. When the authentication succeeds, a WFD connection between the terminal 10A and the printer 100C is established.

When establishing the WFD connection with the printer 100C in T822, the terminal 10A sends print data to the printer 100C in T830 (a process different from FIG. 3). Here, the IP address of the printer 100C, which is the destination of the print data, is sent from the printer 100C to the terminal 10A after the WFD connection has been established (not shown).

When receiving the print data from the terminal 10A in T830, the printer 100C executes printing of an image represented by the print data in T840 (a process different from FIG. 2).

(Case C)

In case C, the terminal 10A accepts selection of the model name "EEE" in the selection screen from the user in T900. In this case, the terminal 10A waits until receiving an AI signal from the printer 100E (a process different from FIG. 3).

The printer 100E sends an ANI signal in T910 while executing the AP process with the AP 50B (YES in S50, S52 of FIG. 2). When establishing an AP connection with the AP 50B in T912, the printer 100E sends an AI signal including an IP address "IPE" and the model name "EEE" of the printer 100E in T920 (NO in S50, YES in S60, S62).

T922 to T950 are the same as T812 to T840 of case B except that the printer 100E is used instead of the printer 100C.

Effect of Present Embodiment

According to the present embodiment, each printer such as the printer 100A can send an AI signal or ANI signal to the terminal 10A before establishing a BT connection with the terminal 10A (T110 of FIG. 4, etc.). For this reason, each printer such as the printer 100A can notify the terminal 10A of the state of that printer more quickly as compared to a configuration in which a signal indicating the state of that printer is sent after the establishment of the BT connection.

Further, according to the present embodiment, the terminal 10A can receive an AI signal or ANI signal from each printer such as the printer 100A before establishing the BT connection with each printer such as the printer 100A (T110, T210, etc. of FIG. 4). For this reason, the terminal 10A can learn the state of each printer such as the printer 100A more quickly as compared to a configuration in which a signal indicating the state of each printer such as the printer 100A is received after the establishment of the BT connection. Then, the terminal 10A displays the model name (e.g., "CCC") of the printer from which the AI signal is sent preferentially over the model name (e.g., "DDD") of the printer from which the ANI signal is sent (T640 of FIG. 6). Consequently, the user can appropriately identify which printer can establish the WFD connection.

(Correspondence Relationship)

Any printer (e.g., 100A) among the group of printers 100 is an example of "communication device". The terminal 10A is an example of "terminal device". The BT OF 120, the Wi-Fi OF 122 are examples of "first wireless interface", "second wireless interface" of "communication device", respectively. The BT OF 20, the Wi-Fi OF 22 are examples of "first wireless interface", "second wireless interface" of "terminal device", respectively. The state in which NO is determined in S10, S30, and S50 of FIG. 2 is an example of "respondent state". Each of the state in which YES is determined in S10, the state in which YES is determined in S30, and the state in which YES is determined in S50 of FIG. 2 is an example of "non-respondent state". The AI signal and the ANI signal are examples of "first signal" and "second signal", respectively. The WFDNW and APNW are examples of "parent station network" and "AP network", respectively.

The state of the printer 100B (i.e., the state in which YES is determined in S10 of FIG. 2) and the status information "CLMAX" are examples of "first non-respondent state" and "first status information", respectively. The state of the printer 100D (i.e., the state in which YES is determined in S30 of FIG. 2) and the status information "WFD process" are examples of "second non-respondent state" and "second status information", respectively. The state of the printer 100E (i.e., the state in which YES is determined in S50 of FIG. 2) and the status information "AP process" are examples of "third non-respondent state" and "third status information", respectively. The WFD process and the AP process are examples of "first belonging process" and "second belonging process", respectively.

Each printer 100A, 100C and each model name "AAA", "CCC" are examples of "first communication device", "first device information", respectively. Each printer 100B, 100D, 100E, 100F and each model name "BBB", "DDD" to "FFF" are examples of "second communication device" and "second device information", respectively. In one example, the printer 100B, the model name "BBB", the IP address "IPB", the printer 100D, the model name "DDD", the IP address "IPD", the AP 50A and the AP 50B are examples of "second communication device", "second device information", "first IP address", "third communication device", "third device information", "second IP address", "first access point" and "second access point", respectively. In another example, the printer 100E, the model name "EEE", the printer 100D, the model name "DDD" and the AP 50B are examples of "second communication device", "second device information", "third communication device", "third device information" and "access point", respectively. In yet another example, the printer 100F, the model name "FFF", the printer 100E, the model name "EEE" and the AP 50B are examples of "second communication device", "second device information", "third communication device", "third device information" and "access point", respectively. In yet another example, the printer 100A, the model name "AAA", the IP address "IPA", the printer 100C, the model name "CCC", the IP address "IPC", the AP 50A and the AP 50B are examples of "first communication device", "first device information", "third IP address", "fourth communication device", "fourth device information", "fourth IP address", "third access point" and "fourth access point", respectively.

The corresponding relationship of each unit of "communication device" is as follows. The processes of S62, S64 of FIG. 2 are examples of processes executed by "cause the first wireless interface to send a first signal". The processes of S22, S24, S42, S442 are examples of processes executed by "cause the first wireless interface to send a second signal". The processes of T820, T930 of FIG. 7 are examples of processes executed by "execute communication of connection information". The processes of T822, T932 are examples of processes executed by "establish the Wi-Fi connection".

The corresponding relationship of each unit of "terminal device" is as follows. In S100 of FIG. 3, the process of receiving the AI signal and the process of receiving the ANI signal are examples of processes executed by "receive a first signal from the first communication device", "receive a second signal different from the first signal from the second communication device", respectively. The process of S150 is an example of a process executed by "display on the display unit first device information". The process of T820 and the process of T822 of FIG. 7 are examples of processes executed by "execute communication of connection information with the first communication device", "establish the Wi-Fi connection", respectively. The processes of S112 and S114 of FIG. 3 are examples of processes executed by "determine whether the terminal device belongs, as a child station, to the first AP network" and "determine whether the terminal device belongs, as a child station, to the third AP network".

Variant 1

In S150 of FIG. 3, instead of displaying the model name corresponding to the higher rank at the upper portion of the screen, the terminal 10A may display the model name as follows. That is, the terminal 10A may display a message prompting selection of a printer to execute printing and model names corresponding to lower ranks (e.g., fourth to sixth ranks) in a first color (e.g., black) and model names corresponding to higher ranks (e.g., first to third ranks) in a second color different from the first color (e.g., red). In this case, since the second color is conspicuous, the model names corresponding to the higher ranks are displayed preferentially. In another variant, the terminal 10A may display only the model names corresponding to higher ranks (e.g., first to third ranks) without displaying the model names corresponding to lower ranks (e.g., fourth to sixth ranks). In this case as well, the model names corresponding to higher ranks are displayed preferentially. Generally speaking, the method of "displayed preferentially" is not limited to the method of the embodiment.

Variant 2

For example, in Case B of FIG. 7, the terminal 10A may operate as the G/O and the printer 100C may operate as the CL. In this case, in T820, the connection information is sent from the terminal 10A to the printer 100C. Generally speaking, "connection information" may be sent from "communication device (or first communication device)" to "terminal device" as in the above embodiment, or may be sent from "terminal device" to "communication device (or first communication device)" as in the present variant.

Variant 3

T700 to T720 of FIGS. 6, T800 to T840, and T900 to T950 of FIG. 7 may not be executed. In the present variant, "execute communication of connection information" and "establish the Wi-Fi connection" may be omitted.

Variant 4

S10 to S24 of FIG. 2 and the process related to CLMAX in S134 of FIG. 3 may not be executed. Generally speaking, "non-respondent state" may not include "first non-respondent state", and "first status information" may not be used.

Variant 5

S30 to S44 of FIG. 2 and the process related to the WFD process in S134 of FIG. 3 may not be executed. Generally speaking, "non-respondent state" may not include "second non-respondent state", and "second status information" may not be used.

Variant 6

The ANI signal may not include the status information. In this case, the same rank is determined in S134 of FIG. 3 regardless of the states of the printers. Generally speaking, "second signal" may not include "status information".

Variant 7

S32 of FIG. 2 may not be executed. That is, in the case of YES in S30, the printer 100A or the like may send an ANI signal including the status information "WFD process" regardless of the number of CL of the printer. Generally speaking, in the case where the state of the communication device is in the second non-respondent state in which the number of child stations is equal to (upper limit −1) and the first belonging process is in execution, "cause the first wireless interface to send a second signal" may cause the first wireless interface to execute sending of the second signal including the second status information.

Variant 8

S50 to S52 of FIG. 2 and the process related to the AP process in S134 of FIG. 3 may not be executed. Generally speaking, "non-respondent state" may not include "third non-respondent state", and "third status information" may not be used.

Variant 9

The processes of S20, S40, and S60 of FIG. 2 may not be executed. That is, the printer 100A or the like may send an AI signal or ANI signal that does not include an IP address even if the printer 100A or the like belong to the APNW. Generally speaking, "first signal" and "second signal" may not include the IP address of the communication device in the case where the communication device belongs as a child station to the AP network. Further, in the present variant, S110 to S124 of FIG. 3 may not be executed. That is, the terminal 10A may determine the first rank in the case where the received signal is the AI signal, and may determine each rank from the second rank onward in accordance with the status information in the case where the received signal is the ANI signal. In the present variant, "determine whether the terminal device belongs, as a child station, to the first AP network" and "determine whether the terminal device belongs, as a child station, to the third AP network" may be omitted.

Variant 10

"First signal" may not be an AI signal, but may be another type of signal of the BT standard. "Second signal" may not be an ANI signal, but may be another type of signal of the BT standard. Generally speaking, "first signal" and "second signal" only need to be different signals.

Variant 11

"Communication device" may not be a printer, but may be for example a scanner, a FAX device, a multi-function device, a PC, or a scanner.

Variant 12

In the aforementioned embodiments, the processes of FIGS. 4 to 7 are implemented by the CPU 32 of the terminal 10A executing the application 42, and the CPU 132 or the like of the printer 100A or the like executing the program 140. However, any of the processes may be implemented by hardware such as a logic circuit.

What is claimed is:

1. A communication device comprising:
a first wireless interface configured to execute wireless communication according to Bluetooth standard;
a second wireless interface configured to execute wireless communication according to Wi-Fi standard, the communication device is configured to form a parent station network that is a wireless network of the Wi-Fi standard and in which the communication device operates as a parent station; and
a controller configured to:
in a case where a state of the communication device is a respondent state, cause the first wireless interface to send a first signal indicating that the communication device is in the respondent state, the respondent state being a state in which a Wi-Fi connection that is a wireless connection via the second wireless interface is able to be established between the communication device and a terminal device, and the first signal being sent from the first wireless interface before a Bluetooth connection that is a wireless connection via the first wireless interface is established between the communication device and the terminal device; and
in a case where a state of the communication device is a non-respondent state, cause the first wireless interface to send a second signal different from the first signal indicating that the communication device is in the non-respondent state, the non-respondent state being a state in which the Wi-Fi connection is not able to be established between the communication device and the terminal device, and the second signal being sent from the first wireless interface before the Bluetooth connection is established between the communication device and the terminal device, the non-respondent state including a first non-respondent state and a second non-respondent state, the first non-respondent state being in which a number of a child station belonging to the parent station network is equal to an upper limit and the second non-respondent state being in which the number of the child station belonging to the parent station network is less than the upper limit and a first belonging process is in execution, the first belonging process being for causing an external device to belong to the parent station network as the child station.

2. The communication device as in claim 1, wherein the controller is further configured to:
in a case where the Bluetooth connection is established between the communication device and the terminal device in response to the first signal being received by the terminal device, execute communication of connection information with the terminal device via the first wireless interface using the Bluetooth connection, the connection information being for establishing the Wi-Fi connection between the communication device and the terminal device; and
in a case where the communication of the connection information is executed with terminal device, establish the Wi-Fi connection between the communication device and the terminal device.

3. The communication device as in claim 1, wherein the non-respondent state includes a third non-respondent state in which a second belonging process is in execution, the second belonging process being for causing the communication device to belong, as a child station, to an AP network that is a wireless network of the Wi-Fi standard and in which an access point operates as a parent station.

4. The communication device as in claim 1, wherein
in a case where the state of the communication device is the respondent state and the communication device belongs, as a child station, to an AP network that is a wireless network of the Wi-Fi standard and in which an access point operates as a parent station, the controller is configured to cause the first wireless interface to send the first signal including an IP address of the communication device, the IP address being used in the AP network, and
in a case where the state of the communication device is the non-respondent state and the communication device belongs, as the child station, to the AP network, the controller is configured to cause the first wireless interface to send the second signal including the IP address of the communication device, the IP address being used in the AP network.

5. The communication device as in claim 1, wherein
the first signal is an ADV_IND signal according to a Bluetooth Low Energy (BLE) scheme of the Bluetooth standard, and
the second signal is an ADV_NONCONN_IND signal according to the BLE scheme.

6. The communication device as in claim 1, wherein
the second signal includes status information indicating a reason why the state of the communication device is the non-respondent state.

7. A non-transitory computer-readable recording medium storing computer-readable instructions for a terminal device, wherein the terminal device comprising:
a first wireless interface configured to execute wireless communication according to Bluetooth standard;
a second wireless interface configured to execute wireless communication according to Wi-Fi standard;
a display unit; and
a processor,
wherein the computer-readable instructions, when executed by the processor, cause the terminal device to:
in a case where a state of a first communication device is a respondent state, receive a first signal indicating that a sender of the first signal is in the respondent state from the first communication device via the first wireless interface, the first communication device being one of a plurality of communication devices that exists around the terminal device, the respondent state being a state in which a Wi-Fi connection that is a wireless connection via the second wireless interface is able to be established between the first communication device and the terminal device, the first signal being received via the first wireless interface before a Bluetooth connection that is a wireless connection via the first wireless interface is established between the first communication device and the terminal device;
in a case where a state of a second communication device different from the first communication device among the plurality of communication devices is a non-respondent state, receive a second signal different from the first signal indicating that a sender of the second signal is in the non-respondent state from the second communication device via the first wireless interface, the non-respondent state being a state in which the Wi-Fi connection is not able to be established between the second communication device and the terminal device, and the second signal being received via the first wireless interface before the Bluetooth connection is established between the second communication device and the terminal device; and display on the display unit first device information related to the first communication device that is a sender of the first signal preferentially over second device information related to the second communication device that is a sender of the second signal,
wherein the non-respondent state comprises a plurality of different non-respondent states, each of which has a different priority.

8. The non-transitory computer-readable recording medium as in claim 7, wherein
the computer-readable instructions further cause the terminal device to:
in a case where the Bluetooth connection is established between the first communication device and the terminal device in response to the displayed first device information being selected by a user, execute communication of connection information with the first communication device via the first wireless interface using the Bluetooth connection, the connection information being for establishing the Wi-Fi connection between the first communication device and the terminal device; and
in a case where the communication of the connection information is executed with the first communication device, establish the Wi-Fi connection between the first communication device and the terminal device.

9. The non-transitory computer-readable recording medium as in claim 7, wherein
the second signal includes status information indicating one of the plurality of different non-respondent states; and
the second device information and the status information are displayed in association with each other on the display unit.

10. The non-transitory computer-readable recording medium as in claim 7, wherein
the second communication device is configured to form a first parent station network that is a wireless network of the Wi-Fi standard and in which the second communication device operates as a parent station, and
the second signal received from the second communication device includes first status information indicating that a number of a child station belonging to the first parent station network is equal to an upper limit as one of the plurality of different non-respondent states,
wherein in a case where a state of a third communication device different from the first and second communication devices among the plurality of communication devices is one of the plurality of different non-respondent states, the second signal is further received from the third communication device via the first wireless interface,
the third communication device is configured to form a second parent station network that is a wireless network of the Wi-Fi standard and in which the third communication device operates as a parent station,
the second signal received from the third communication device includes second status information indicating that a first belonging process is in execution as a different one of the plurality of different non-respondent states,
the first belonging process is for causing an external device to belong to the second parent station network as a child station,
wherein third device information related to the third communication device that is a sender of the second signal including the second status information is displayed on the display unit preferentially over the second device information related to the second communication device that is a sender of the second signal including the first status information.

11. The non-transitory computer-readable recording medium as in claim 10, wherein
in a case where the second communication device belongs, as a child station, to a first AP network that is a wireless network of the Wi-Fi standard and in which a first access point operates as a parent station, the second signal received from the second communication device includes first IP address of the second communication device, the first IP address being used in the first AP network,
wherein the computer-readable instructions further cause the terminal device to:
determine whether the terminal device belongs, as a child station, to the first AP network using the first IP address included in the second signal received from the second communication device,
wherein in a case where the third communication device belongs, as a child station, to a second AP network that is a wireless network of the Wi-Fi standard and in which a second access point operates as a parent station, the second signal received from the third communication device includes second IP address of the third communication device, the second IP address being used in the second AP network,
wherein the computer-readable instructions further cause the terminal device to:
determine whether the terminal device belongs, as a child station, to the second AP network using the second IP address included in the second signal received from the third communication device,
wherein in a case where it is determined that the terminal device does not belong, as a child station, to the first AP network and it is determined that the terminal device does not belong, as a child station, to the second AP network, the third device information is displayed on the display unit preferentially over the second device information,
in a case where it is determined that the terminal device does not belong, as a child station, to the first AP network and it is determined that the terminal device belongs, as a child station, to the second AP network, the third device information is displayed on the display unit preferentially over the second device information, and
in a case where it is determined that the terminal device belongs, as a child station, to the first AP network and it is determined that the terminal device does not belong, as a child station, to the second AP network, the second device information is displayed on the display unit preferentially over the third device information.

12. The non-transitory computer-readable recording medium as in claim 7, wherein
the second signal received from the second communication device includes third status information indicating that a second belonging process is in execution as one of the plurality of different non-respondent states,
the second belonging process is for causing the second communication device to belong to an AP network that is a wireless network of the Wi-Fi standard and in which an access point operates as a parent station,
wherein in a case where a state of a third communication device different from the first and second communication devices among the plurality of communication devices is one of the plurality of different non-respondent states, the second signal is further received from the third communication device via the first wireless interface, the third communication device is configured to form a parent station network that is a wireless connection of the Wi-Fi standard and in which the third communication device operates as a parent station, the second signal received from the third communication device includes second status information indicating that a first belonging process is in execution as a different one of the plurality of different non-respondent states, the first belonging process is for causing an external device to belong to the parent station network as a child station, wherein third device information related to the third communication device that is a sender of the second signal including the second status information is displayed on the display unit preferentially over the second device information related to the second communication device that is a sender of the second signal including the third status information.

13. The non-transitory computer-readable recording medium as in claim 7, wherein the second communication device is configured to form a parent station network that is a wireless network of the Wi-Fi standard and in which the second communication device operates as a parent station, and the second signal received from the second communication device includes first status information indicating that a number of a child station belonging to the parent station network is equal to an upper limit as one of the plurality of different non-respondent states, wherein in a case where a state of a third communication device different from the first and second communication devices among the plurality of communication devices is one of the plurality of different non-respondent states, the second signal is further received from the third communication device via the first wireless interface, the second signal received from the third communication device includes third status information indicating that a second belonging process is in execution as a different one of the plurality of different non-respondent states, the second belonging process is for causing the third communication device to belong, as a child station, to an AP network that is a wireless network of the Wi-Fi standard and in which an access point operates as a parent station, wherein third device information related to the third communication device that is a sender of the second signal including the third status information is displayed on the display unit preferentially over second device information related to the second communication device that is a sender of the second signal including the first status information.

14. The non-transitory computer-readable recording medium as in claim 7, wherein in a case where the first communication device belongs, as a child station, to a third AP network that is a wireless network of the Wi-Fi standard and in which a third access point operates as a parent station, the first signal received from the first communication device includes a third IP address of the first communication device, the third IP address being used in the third AP network, wherein the computer-readable instructions further cause the terminal device to:

determine whether the terminal device belongs, as a child station, to the third AP network using the third IP address included in the first signal received from the first communication device, wherein in a case where a state of a fourth communication device different from the first and second communication devices among the plurality of communication devices is a respondent state, receive the first signal from the fourth communication device via the first wireless interface, in a case where the fourth communication device belongs, as a child station, to a fourth AP network that is a wireless network of the Wi-Fi standard and in which a fourth access point operates as a parent station, the first signal received from the fourth communication device includes a fourth IP address of the fourth communication device, the fourth IP address being used in the fourth AP network, wherein the computer-readable instructions further cause the terminal device to:

determine whether the terminal device belongs, as a child station, to the fourth AP network using the fourth IP address included in the first signal received from the fourth communication device, wherein in a case where it is determined that the terminal device belongs, as a child station, to the third AP network and it is determined that the terminal device does not belong, as a child station, to the fourth AP network, the first device information related to the first communication device that belongs to the third AP network is displayed on the display unit preferentially over fourth device information related to the fourth communication device that belongs to the fourth AP network.

15. The non-transitory computer-readable recording medium as in claim 7, wherein the first signal is an ADV_IND signal according to a Bluetooth Low Energy (BLE) scheme of the Bluetooth standard, and the second signal is an ADV_NONCONN_IND signal according to the BLE scheme.

16. The non-transitory computer-readable recording medium as in claim 9, wherein the computer-readable instructions further cause the terminal device to:

receive a second signal from each of a plurality of communication devices, each second signal including the status information indicating one of the plurality of different non-respondent states, and display the plurality of communication devices in an order at least based on the status information, respectively, included in the second signal from each of the plurality of communication device.

* * * * *